Figure 1:
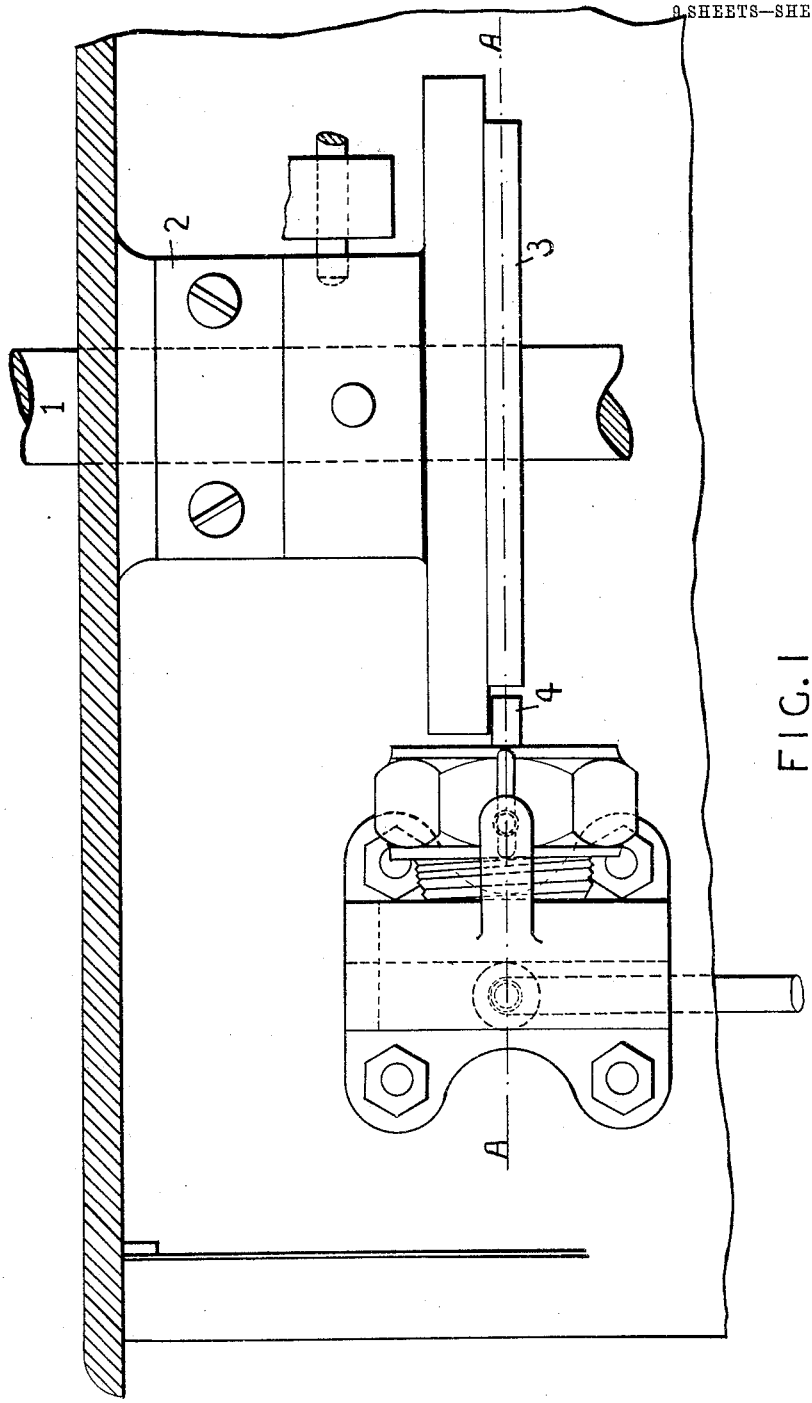

No. 789,754. PATENTED MAY 16, 1905.
W. J. NAPIER.
GOVERNOR FOR NON-AUTOMATIC ELECTRIC MOTOR CONTROLLERS.
APPLICATION FILED JAN. 6, 1904.

9 SHEETS—SHEET 2.

Witnesses.
Frank O'Connor
M. G. Crawford

Inventor.
William John Napier
by P. Parkhurst
Attorney.

No. 789,754. PATENTED MAY 16, 1905.
W. J. NAPIER.
GOVERNOR FOR NON-AUTOMATIC ELECTRIC MOTOR CONTROLLERS.
APPLICATION FILED JAN. 6, 1904.

9 SHEETS—SHEET 3.

Witnesses.
Frank O'Connor
M. G. Crawford

Inventor.
William John Napier
by
Attorney

No. 789,754. PATENTED MAY 16, 1905.
W. J. NAPIER.
GOVERNOR FOR NON-AUTOMATIC ELECTRIC MOTOR CONTROLLERS.
APPLICATION FILED JAN. 6, 1904.

9 SHEETS—SHEET 4.

No. 789,754. PATENTED MAY 16, 1905.
W. J. NAPIER.
GOVERNOR FOR NON-AUTOMATIC ELECTRIC MOTOR CONTROLLERS.
APPLICATION FILED JAN. 6, 1904.

9 SHEETS—SHEET 5.

Witnesses.
Frank O'Connor
N. G. Crawford

Inventor.
William John Napier
by H. Parker Smith
Attorney

No. 789,754.

PATENTED MAY 16, 1905.

W. J. NAPIER.
GOVERNOR FOR NON-AUTOMATIC ELECTRIC MOTOR CONTROLLERS.
APPLICATION FILED JAN. 6, 1904.

9 SHEETS—SHEET 9.

Fig. 9.

Witnesses
Frank O'Connor
M. G. Crawford

Inventor
William John Napier
By his Attorney
R. Van Ker Smith

No. 789,754.

Patented May 16, 1905.

UNITED STATES PATENT OFFICE.

WILLIAM JOHN NAPIER, OF LEICHHARDT, NEAR SYDNEY, NEW SOUTH WALES, AUSTRALIA.

GOVERNOR FOR NON-AUTOMATIC ELECTRIC-MOTOR CONTROLLERS.

SPECIFICATION forming part of Letters Patent No. 789,754, dated May 16, 1905.

Application filed January 6, 1904. Serial No. 187,864.

*To all whom it may concern:*

Be it known that I, WILLIAM JOHN NAPIER, electrical engineer, a subject of the King of Great Britain and Ireland, residing in Arthur street, Leichhardt, near Sydney, in the State of New South Wales, Australia, have invented a new and useful Governor for Non-Automatic Electric-Motor Controllers, of which the following is a specification.

This invention relates to governor mechanism designed to prevent go-ahead movement of the hand-lever spindle of an electric-motor controller and consequent accession of current while the motor continues to accelerate and until it attains a speed corresponding with the current passing through it on any given step.

My invention does not refer to automatic controllers which are designed to automatically rotate the spindle which carries the contacts so as to increase the flow of current step by step as the motor or motors accelerate and generate counter electromotive force and until the last notch is reached. In that type of apparatus there is no substantial danger of overloading the motor, because the current is only increased as soon as the counter electromotive force of the motor due to its speed has cut down the flow of current in the circuit to a point approximating the normal.

My invention relates solely to a governor for operating with manual controllers, in which, owing to want of care on the part of the driver, there is an ever-present danger of closing the contacts in a too-rapid succession and overloading the motor while it is rotating only at a low speed corresponding with a relatively smaller flow of current.

My apparatus is adapted to be used with any controller, whether of the simple rheostat or series-parallel type, and is adapted to be used either for single or multiple control apparatus.

In carrying out my invention I provide a locking-pawl suitably mounted in relation to a cam or detent piece on the controller-spindle and operate this pawl by pneumatic electrical mechanism, so as to advance it to engage with and lock said detent-piece during the time that the motor is accelerating, and to retire it, so as to leave the controller-spindle free to be rotated to the next notch, as soon as the motor has speeded up sufficiently to generate a counter electromotive force imposing sufficient resistance in the motor-circuit to cut the flow of current down to the normal point. The mechanism which moves the stop-pawl is operated by an appliance which consists in its simplest form of an electromagnet in shunt or series with the motor-circuit adapted to act upon an armature which is constantly subject to the reverse pull of an air-piston or a spring. The piston or spring holds the armature with a definite resistance to attraction by the magnet, and the magnet is wound so that a flow of current in excess of the normal working current is required to energize it sufficiently to overcome the air-piston or spring. The armature acts upon an air-valve which conveys air under pressure to or releases air from a cylinder in which moves a piston mechanically connected with the stop-pawl. The excess current which flows through the electromagnet when the resistance is diminished by cutting out controller-coils or regrouping the circuits in certain steps in the series-parallel method of control is thus used to move the valve, whereby air-pressure is sent to a cylinder so as to act on a piston, which piston advances the stop-pawl into engagement with the detent-piece and prevents movement over a second or subsequent contact to augment the current until the flow of current through the motor or motors falls to a point corresponding to counter electromotive force generated in the motor-armature. When the governor-magnet weakens sufficiently to allow the spring or the air-pressure to reverse its armature, the air-valve is reversed, whereupon the pneumatic mechanism which moves the locking-pawl is reversed, withdrawing the pawl and leaving the spindle of the controller free to be moved by manual operation to the next notch, whereupon it is again locked automatically. A positive one-step-up motion is thus secured and risk of flooding the motor avoided.

It is indifferent whether the means used for conveying the impulse of the governing-magnet to the stop-pawl be mechanical or pneumatic or whether the return of the pawl be effected by mechanical or pneumatic means. The principle of operation is uniformly the same and depends upon taking advantage of the increased pull exercised by the governing-magnet when it is energized by a current substantially heavier than the current required to operate the motor or motors efficiently or any given contact.

Figure 2:
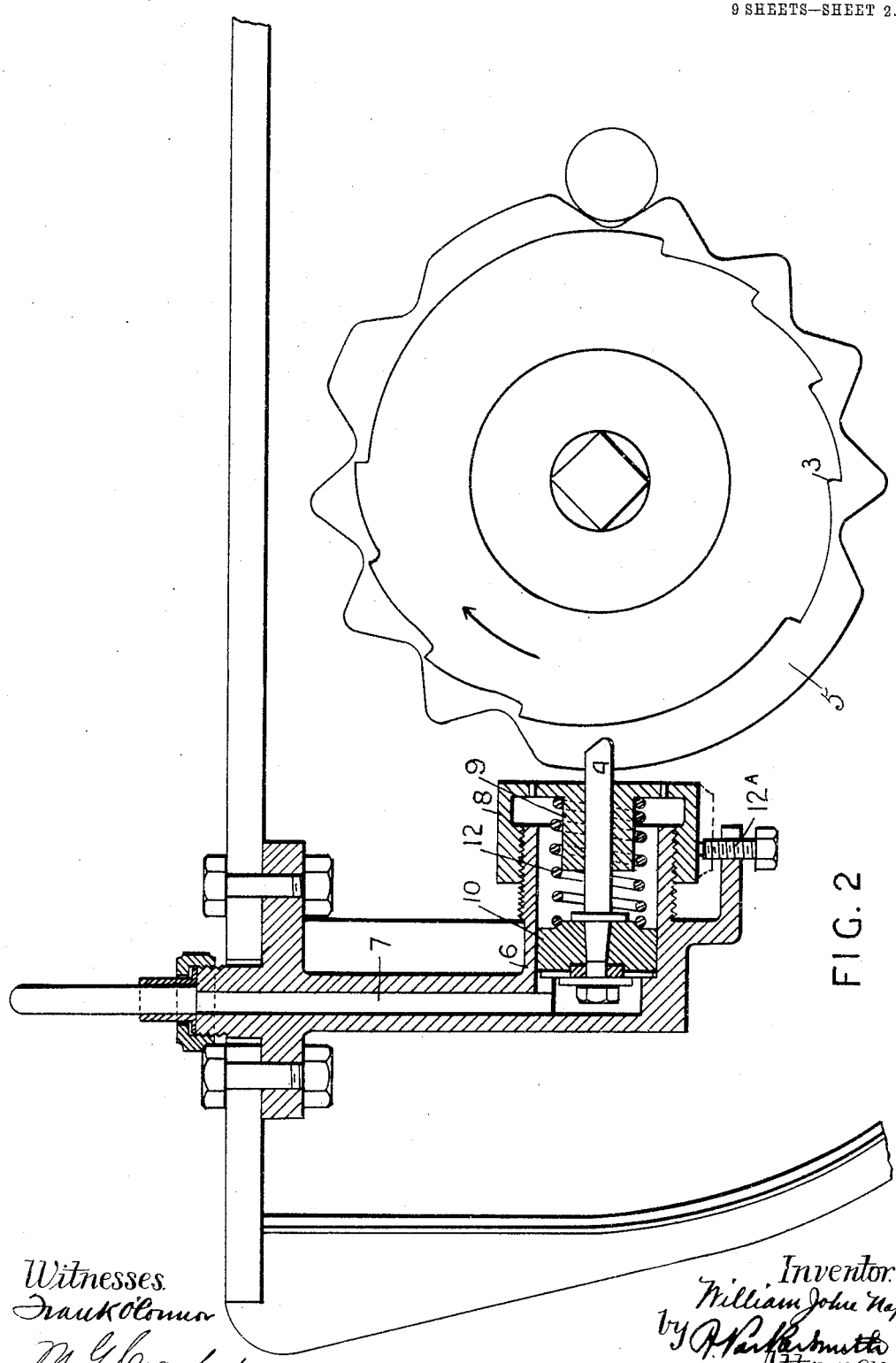
Figure 3:
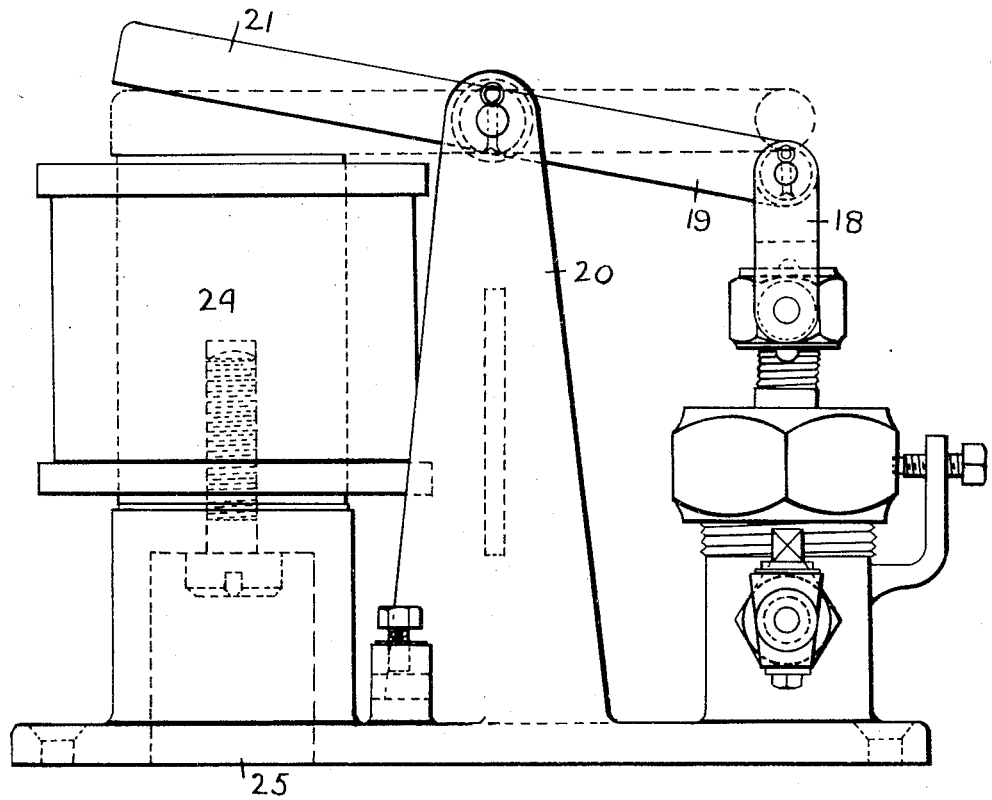
Figure 4:
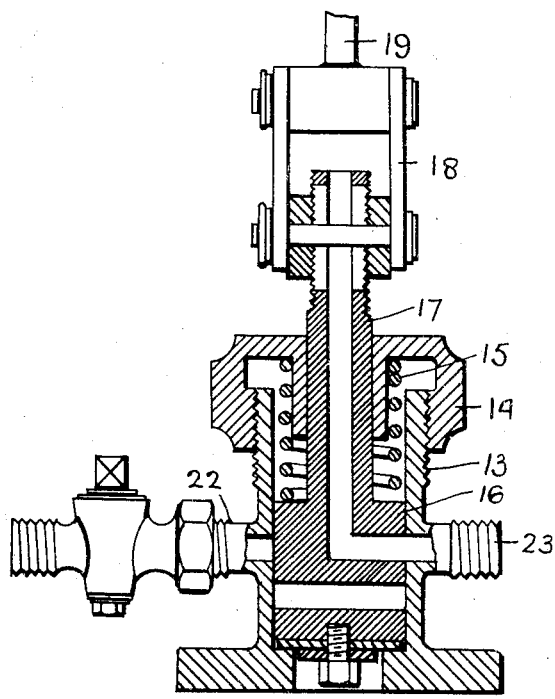
Figure 5:
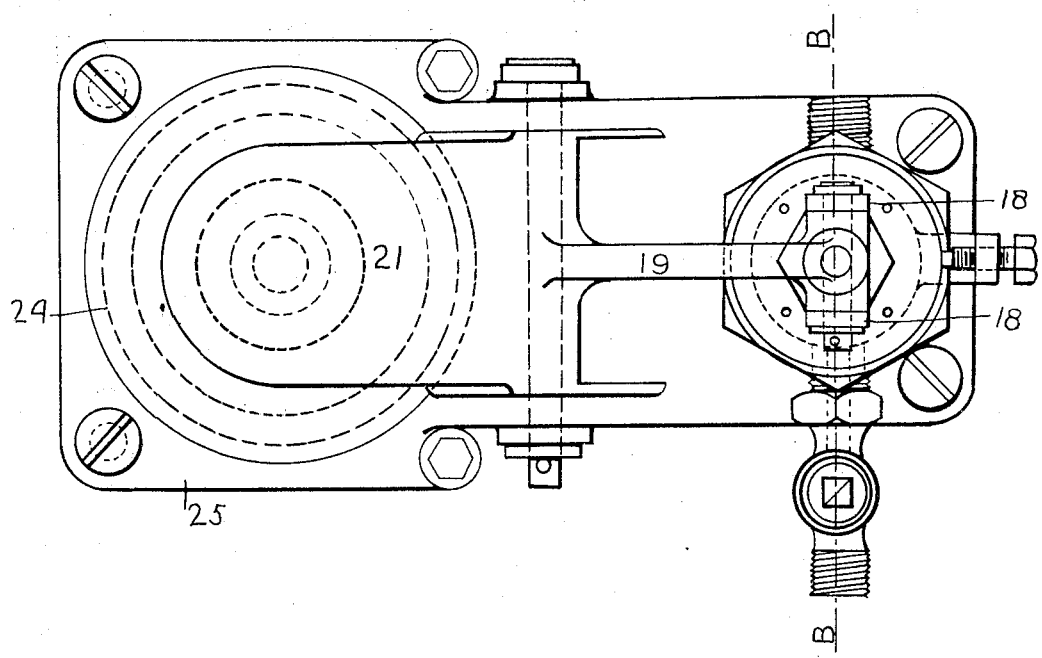
Figure 6:
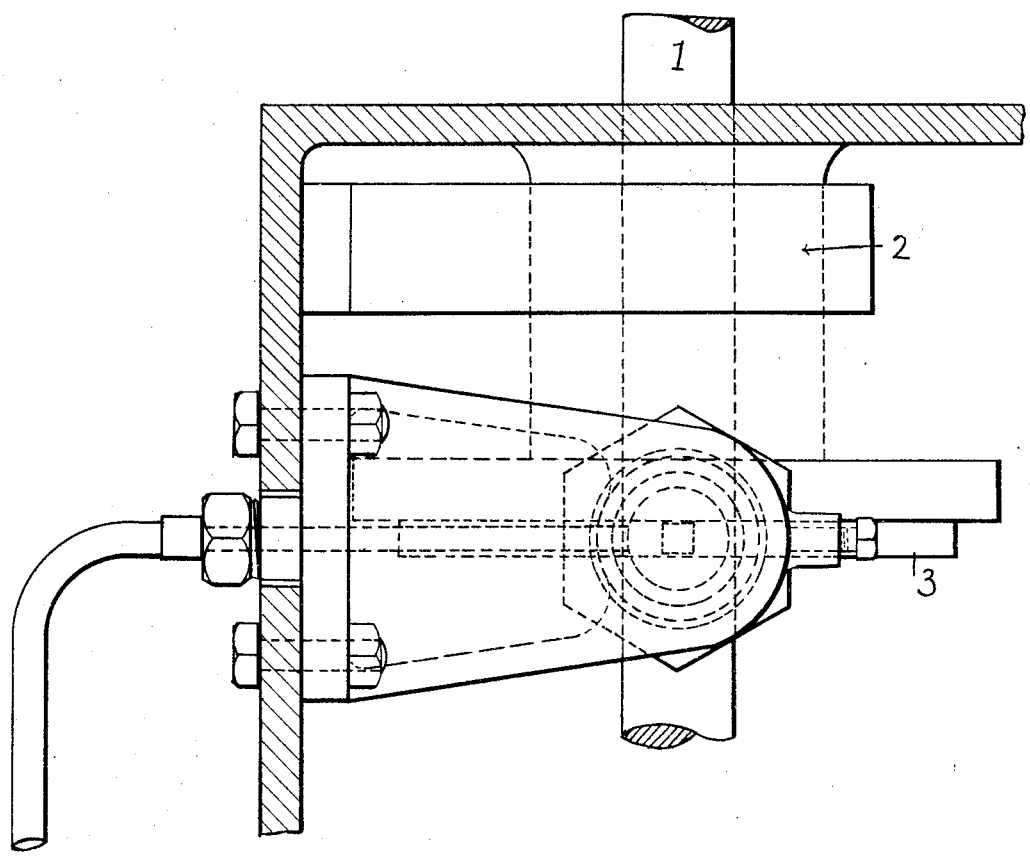
Figure 7:
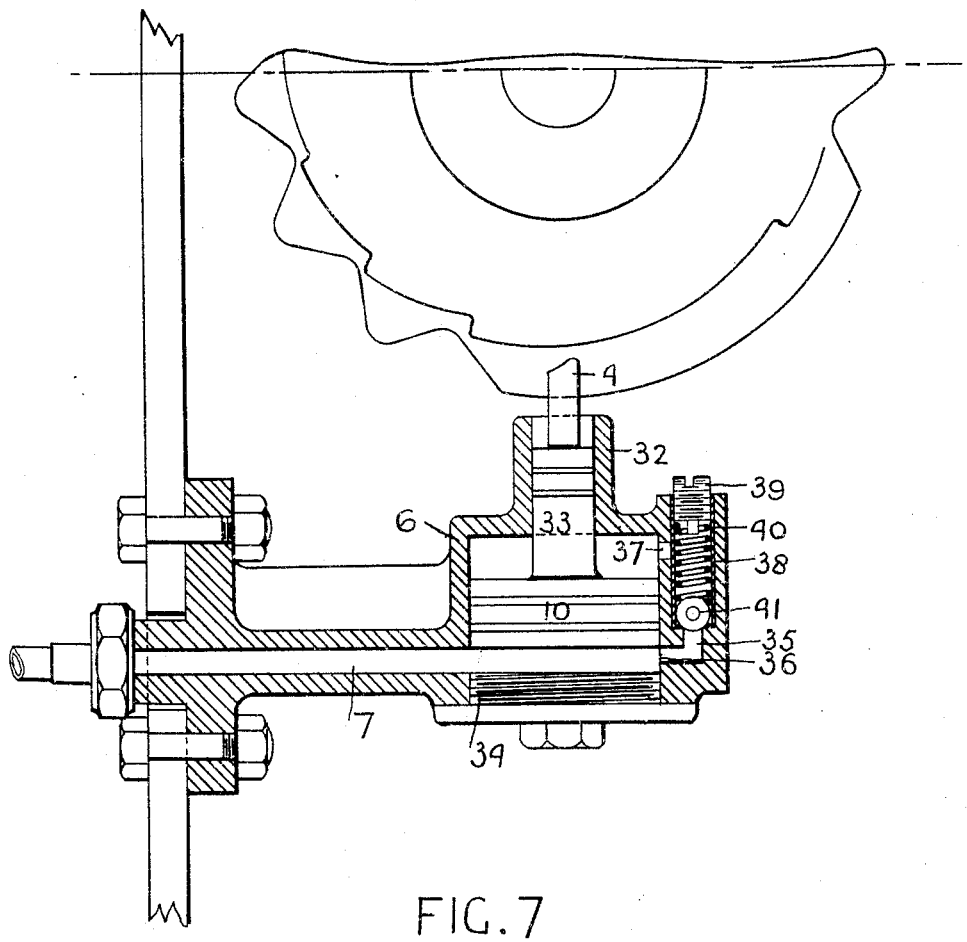
Figure 8:
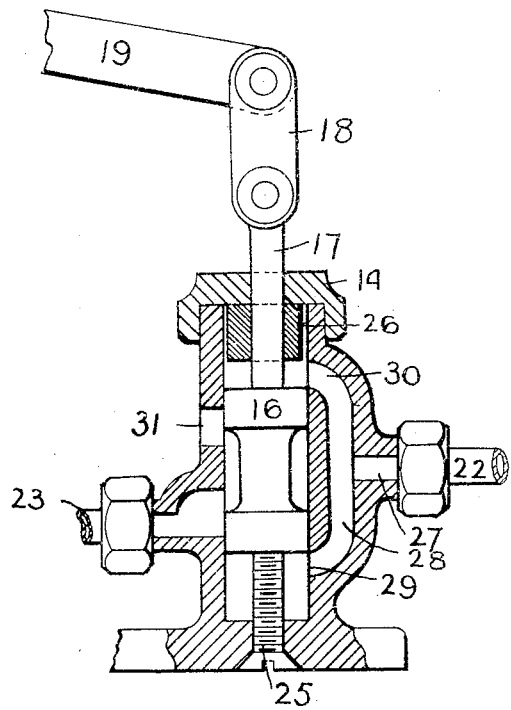

Referring to the annexed drawings, Figure 1 is an elevation of the stop-pawl and detent and associated parts within the controller-case, the pawl being adapted to be advanced by pneumatic action and returned by a spring. Fig. 2, a sectional plan on line A A, Fig. 1, showing the controller-detent in plan and the pneumatic and spring mechanism in section; Fig. 3, an elevation illustrative of the governor-magnet and the air-valve operated thereby; Fig. 4, a transverse section through the air-valve on line B B, Fig. 5; Fig. 5, a top plan of the governor-magnet and air-valve shown in elevation in Fig. 3; Fig. 6, a rear side elevation of the pneumatic device shown in Fig. 1, illustrating the mounting of same in the controller-case; Fig. 7, a sectional plan similar to that shown in Fig. 2, but illustrating a pneumatic arrangement for retiring as well as for advancing the stop-pawl; Fig. 8, an alternative construction of air-valve of the piston type balanced and counterweighted with air-pressure instead of by means of a spring, as in Fig. 4. Fig. 9 is a diagrammatic view showing all the parts of my invention assembled in their relative relation.

Referring to Figs. 1 and 2, 1 is the controller-spindle, which carries a hand-lever at the top, by which it is operated manually. 2 is its upper bearing in the controller-case, (shown at 51 and 52 in Fig. 9,) and 3 the detent-wheel, which is mounted upon it to coact with the stop-pawl 4. 5 is the notched disk, also mounted on the controller-spindle 1 for holding said spindle steady at any "notch" at which it may be set by the driver, so as to prevent change of position by vibration. The face of the detent-wheel 3 is cut in steps, as shown, at the necessary positions corresponding to the points of the notched disk, and the forward end of the stop-pawl is formed with an angular face to coact with the face of the detent-wheel, so that when the pawl is advanced against said face forward movement in the direction indicated by the arrow will be prevented, while at any time the controller-spindle may be run back to the cut-off position as may be necessary for stopping the motor or motors. 6 is an air-cylinder served by an air-pipe 7, whose connection to the air-valve will be subsequently described. This cylinder is provided with a cap 8, with an internal sleeve 9, which acts as a stop for the piston 10 and a guide for the stop-pawl 4, which is carried by the piston. 12 is a coiled spring in compression adapted to hold the stop-pawl back, so as to leave the controller-spindle free, as shown in Fig. 2. $12^a$ is a pinching-screw working through a bracket for setting the cap 8, as may be required to obtain proper regulation of the pressure of the spring 12 and the proper travel of the piston 10.

Referring to Figs. 3 and 4, 13 is a valve-casing which is cylindrical in section. It is provided with a cap 14, similar in construction and mounting to the cap 8 of the cylinder 6. Within it is a spring 15, which normally tends to depress the cored piston 16. This piston carries a stout rod 17, which works up through the cap 14 and is connected at its head by links 18 to the scale-beam 19, which is mounted on the brackets 20 and carries an armature-plate 21. 22 is an air-service pipe from a source of air-pressure which in certain cases may be the brake-reservoir of a street-car; but preferably an air-supply is obtained from separate mechanism adapted to supply air under constant pressure. 23 is a pipe connection for the pipe 7, which leads to the cylinder 6. (Shown in Fig. 2.) 24 is an electromagnet ("governor-magnet") with iron core mounted on the same base 25 as the air-valve and the brackets 20. Its coils are connected up in series or shunt with the motor-circuit.

In Fig. 7 an arrangement is shown in which the returning-spring 12 is dispensed with. The cylinder 6 is formed differently and has a neck part 32, which carries the trunk 33 of the piston, the stop-pawl 4 being supported in the trunk 33 and made to work through a square sleeve to prevent turning. The piston 10 must be inserted from the back in view of this construction of the cylinder, and for that purpose the cylinder is bored through from the back and a screwed cover 34 inserted. There is a by-pass 35 connecting the two ends of the cylinder at 36 and 37. In this by-pass is a chamber 38, closed by a screw-cap 39 and carrying a coiled spring 40 in compression and a non-return ball-valve 41, adapted to take its seating, as shown, in the by-pass. The connection to the air-valve through the pipe 7 is precisely the same as when the construction shown in Figs. 1 to 6 is used.

In Fig. 8, which shows a modified construction of the valve shown in Fig. 4, a loading-spring corresponding with the spring 15 is not used. The air service and supply pipes 22 and 23 correspond with the parts similarly numbered in the design shown in Fig. 4. The valve 24 is of the double-piston type. There is a stop-screw 25 below it to limit its motion downward, and its motion upward is limited by the sleeve 26 of the cap 14, through which works the piston-rod 17, connected by links 18 to the scale-beam carrier 19 of the armature 21. The port 27, leading into the pipe 23, opens into a passage 28, terminating below in a port 29 and above in a port 30 in the valve-casing. There is also an exhaust-port 31 open to the atmosphere.

If desired, the air-valve may be made double-ported, so as to operate after the manner of an ordinary engine-valve to supply pressure alternately, according to the position of the valve, to one side or other of the piston 10 in the cylinder 6 for the purpose of advancing and retiring the same, respectively; but in this case an air-pipe would require to be carried from the additional port in the valve-casing into the front end of the cylinder 6 to convey pressure to and exhaust-pressure from the forward end of the said cylinder.

When the pneumatic feature is used, an air-supply is obtained through an independent air-pump with automatic cut-out working off the main circuit, the reservoir being of ample dimensions and provided with a blow-off valve to insure uniform pressure. The air-brake reservoir may be used when the return of the air-valve is effected by a spring, as shown in Fig. 4; but the brake-pressure is not ordinarily sufficiently uniform to make its use practicable where the design of air-balanced air-valve shown in Fig. 8 is used. It is essential that the pressure opposed to the governor-magnet 24 should be approximately uniform in order to secure uniformity of action in the working of the apparatus.

In diagrammatic view, Fig. 9, 53 represents the trolley-wire; 54, the trolley-pole broken off; 55, the line connection from the same to the usual form of automatic switch 56; 57, the connection to the usual canopy-switch 58, and 59 the fuse, and 60 the connection to one end of the coil 24 of the magnet or solenoid. 61 is the connection from the other end of the magnet-coil to the controller; 62, the connection from the controller to the adjustable resistance 63; 64 65, the motors which are shown in series, and 66 ground connection through the wheels and rails.

The mode of operation of the parts shown in Figs. 3, 4, and 5 is as follows: Under normal working conditions the position of the valve and the parts is as shown in the drawings. The altered position into which they are moved when the controller-spindle is moved a step ahead and before the motor or motors have accelerated to a corresponding speed is shown in dotted lines in Fig. 3. Assuming the position to be at the normal, Fig. 3, as shown in the full lines, the interior of the lock-cylinder 6 is in communication with the atmosphere through the pipe 7, the port 23, and the hollow stem 17 of the piston 16. The piston 16 is in its lowest position, as shown in Fig. 4. Upon an accession of current to the motor the pull of the governor-magnet 24 upon the armature 21 overcomes the resistance of the spring 15, and thereupon the valve 16 is lifted until its lower face opens out the ports 22 and 23, and so places the source of air-pressure represented by the compressed-air reservoir 50 (see Fig. 9) in connection with the cylinder 6 through the valve-casing and the pipe 7. Immediately that occurs the air-pressure acting behind the piston 10 overcomes the reverse pressure of the spring 12, advances the stop-pawl 4 into contact with the detent 3, and so prevents the driver from moving the controller ahead another notch. When the motor is accelerating up to the point corresponding to the current passing through it, the counter electromotive force of the motor-armature diminishes the flow of current in the governor-magnet 24 gradually until a point is reached at which the spring 15 is able to overcome the pull of the magnet. Thereupon the piston 16 is moved downward by the pressure of the spring 15 and the cylinder 6 again placed in communication with the atmosphere through the passage in the stem 17 of the piston 16, and pressure being so relieved from behind the piston 10 the spring 12 retires the piston, and with it the stop-pawl 4, leaving the detent unchecked, and so frees the controller-spindle 1 for movement another notch ahead by the driver.

The operation of the modified construction of stop mechanism shown in Fig. 7, in which the stop-pawl 4 is retired by pneumatic pressure instead of by a spring, is as follows: When pressure is applied through the pipe 7 and acts on the piston 10, the latter is advanced forward, carrying the stop-pawl 4 into contact with the detent, with the result previously described. This air-pressure, as well as acting on the rear side of the piston 10, lifts the valve 41 in the by-pass 35 against the pressure of the spring 40 and fills the annular space in front of the piston 10 with air-pressure. The effective pressure on the piston 10 is that due to the difference in area between its two sides, or, in other words, approximates to the pressure on the area of the trunk 33. Upon release of air-pressure through the pipe 7 by means of the air-valve, Fig. 4, the pressure behind the piston finds ready escape, while the pressure on its forward side first presses the valve 41 to its seat and then acting on the front end of the piston retires it, bringing back with it the trunk 33 and stop-pawl 4 thereon. It is immaterial whether there is a little leakage or not from the front end of the cylinder, because the air-pressure therein will be replenished through the non-return valve 41 while the piston is pressed forward, and so the pressure will be at the normal point when it is required to act for the purpose of retiring the piston.

The action of the modified form of valve illustrated in Fig. 8 is very similar to that of the valve shown in Fig. 4. In the latter the valve is balanced, and when it is in the lower position the pressure through the port 22 may tend to bind it in the case, and so require to move it a force additional to that demanded for the compression of the spring 15. In the modified design shown in Fig. 8, where the valve is also shown in the lower position, the pressure which enters through the pipe 22 has no tendency to bind the valve in the case. Portion of this pressure is applied to the upper end of the valve and takes the place of the pressure of the spring used in the other design, Fig. 4. In the position shown in Fig. 8 of the drawings (where the valve is at the bottom of its stroke) the cylinder 6, which communicates with the port 23 through the pipe 7, is open to exhaust. There is a free opening between the ports 23 and 31, allowing the pressure to blow into the atmosphere. When the governor-magnet 24, acting upon the armature 21, lifts the valve 16 by means of its spindle 17 in opposition to the pressure which enters the upper part of the casing through the port 30, the port 29 is put into communication with the port 23 and the connection between the ports 23 and 31 to open to the atmosphere is simultaneously closed. Thereupon pressure passes from the pipe 22 through the passage 27 and the ports 29 and 23 through the pipe 7 to the cylinder 6 and applying pressure thereto brings the stop-pawl up to the detent, as has been previously described.

The advantages of my invention comprise the positive nature of the lock, which prevents the burning out of the motor by an excess of current, the automatic release of said lock when normal conditions are reëstablished, and its non-interference with the shutting off or reduction of the current at any time.

It is evident, of course, that changes in the details of construction other than those herein illustrated could be made without departing from the spirit and scope of my invention so long as the variation of the current is made to lock the controller against movements such as would tend to produce further current variations. Means other than magnets responsive to current variations might be used, and the electroresponsive device might be connected up in other than series relation with the main circuit. My invention might also be applied to other purposes besides the protection of motors.

Having therefore described my invention, what I claim as new, and desire to protect by Letters Patent, is—

1. The combination with an electric motor, a supply-circuit therefor and a current-controller for said supply-circuit, of mechanism capable of locking the controller at each position of adjustment, means actuated by non-electric energy for operating said mechanism and apparatus responsive to variations of current in the supply-circuit for controlling said means.

2. The combination with an electric motor, a supply-circuit therefor and a current-controller for said supply-circuit, of mechanism operated by compressed air to lock the controller at each position of adjustment and apparatus responsive to variations of current in the supply-circuit for controlling the compressed air supplied to said locking mechanism.

3. The combination with an electric motor, a supply-circuit therefor, and a current-controller for said circuit, of mechanism capable of locking the controller at each position of adjustment, and mechanism operated by variations of current in the supply-circuit to throw said locking mechanism in and out of engagement, said last-mentioned mechanism comprising an electromagnet included in the supply-circuit, a movable armature therefor, a source of compressed air, a cylinder, a valve actuated by the armature controlling the connection between the source of compressed air and the cylinder, and a piston in said cylinder operatively connected to the locking mechanism.

4. The combination with an electric motor, a supply-circuit therefor, and a current-controller for said circuit, of mechanism capable of locking the controller at each position of adjustment, and mechanism operated by variations of current in the supply-circuit to throw said locking mechanism in and out of engagement, said last-mentioned mechanism comprising an electromagnet included in the supply-circuit, a movable armature therefor, a source of compressed air, a cylinder, a valve actuated by the armature controlling the connection between the source of compressed air and the cylinder, and a piston in said cylinder operatively connected to the locking mechanism, said locking mechanism comprising a ratchet-wheel on the controller-shaft, a pawl capable of engaging therewith, and elastic means normally holding said pawl out of engagement.

5. The combination with an electric circuit, and a controller therefor, of a normally disengaged locking device for said controller, a compressed-air cylinder and piston therein adapted to force said locking device into engagement, a valve capable of admitting compressed air to said cylinder and exhausting it therefrom, and a magnet included in the electric circuit and actuating said valve.

6. The combination of an electric-controller-locking device, a trunk-piston connected thereto, a cylinder in which the piston reciprocates provided with ports at each end and a head through which the piston-trunk extends, an air-conduit connected to both ports, and a check-valve in that part of said air-conduit connecting with the port at the trunk end of the cylinder, said check-valve opening toward the cylinder.

In testimony whereof I have hereunto set my hand in presence of two subscribing witnesses.

WILLIAM JOHN NAPIER.

Witnesses:
W. I. DAVIS,
C. G. HEPBURN.